United States Patent Office 3,437,451
Patented Apr. 8, 1969

3,437,451
SELECTIVE PRECIPITATION OF POTASSIUM CHLORIDE FROM BRINE USING ORGANOAMINES
Richard L. Every, James O. Thieme, and Burton M. Casad, Ponca City, Okla., assignors to Continental Oil Company, Ponca City, Okla., a corporation of Delaware
No Drawing. Filed Dec. 28, 1965, Ser. No. 517,154
Int. Cl. B01j 17/06
U.S. Cl. 23—300                8 Claims

ABSTRACT OF THE DISCLOSURE

Potassium chloride is precipitated from a sodium chloride solution by adding an alkylaminoamine at a temperature at which the amine is soluble in the solution.

---

This invention relates to recovery of potassium chloride (KCl) from brine.

Potassium chloride usually occurs in mineral deposits closely associated with sodium chloride (NaCl). In many cases, potassium chloride exists in admixture or in combination with sodium chloride in the form of a potassium chloride-rich strata, containing 15 to 60 percent by weight of KCl based upon the total weight of KCl and NaCl in the strata. These mineral deposits frequently also contain other materials such as clay and salts of calcium, magnesium, usually as the sulphate, and the like in small quantities, e.g., 2 to 15 weight percent.

Subterranean deposits of such potassium chloride-sodium chloride strata are frequently very deep. For example, Canadian deposits of this character are often found 3,000 feet or more below the ground surface.

In recent years a great deal of interest has been shown in solution mining such deposits with water. Theoretically, solution mining would appear to be attractive since sodium chloride is substantially as soluble in cold water as in hot water, whereas, potassium chloride is substantially more soluble in hot water, thus the salt formation can be dissolved by contacting with hot water and the potassium chloride precipitated after bringing the solution to the surface by cooling. The hot salt water is then reheated and circulated back to the subterranean formation to selectively remove additional KCl.

A number of solution mining schemes have been proposed for removing the KCl from such salt formations. Both single wells with hot brine flowing down one conduit and brine being produced through another and dual or multiple wells have been employed. In the multiple well schemes, hot water or brine is pumped into an input well and KCl enriched brine produced from one or more recovery wells. The hot KCl enriched brine is cooled to precipitate KCl and the brine reheated and pumped back into the salt formation.

Unfortunately, due to the large amount of fluid which must be heated and cooled, solution mining has not been as economically attractive as it might be. If a larger percent of KCl could be recovered per cycle, solution mining would be more competitive and large deposits of KCl in NaCl deposits could be tapped.

It is, therefore, an object of this invention to provide a method of precipitating a larger percent of KCl from KCl-NaCl brine than that which is recovered simply by cooling.

Other objects, features and advantages of this invention will be apparent to those skilled in the art having been given this disclosure and the appended claims.

According to this invention, KCl is precipitated from KCl-NaCl brines by addition of certain oxygen and/or nitrogen-containing organic, water-soluble solvents which are normally liquid such as alcohols, ketones and amines.

In a more limited aspect of this invention, the added compounds exhibit inverse solubility in water with heat.

As has been indicated, in extracting KCl from KCl-NaCl salt deposits, hot brine is circulated in the formation. Generally, two boreholes or wells are drilled into the KCl rich formation and a fracture is created between the two wells by well known fracturing methods widely used in the petroleum art. Water is circulated initially forming a brine. It should be understood that the rate of NaCl solution is relatively rapid, whereas, the rate of KCl solution is comparatively slow. For example, with water at 110° F. it is frequently found that the KCl solution rate will be in the range 0.01 pound per hour per square foot extracting surface. Thus, the water rapidly becomes saturated with respect to NaCl. This brine solution is returned to the surface through the producing well and is heated to at least 100° F. and preferably to 125 to 160° F. The brine should be essentially saturated with respect to NaCl prior to the time the recovery of KCl is undertaken. That is, the brine will contain 95 to 100% of its saturation capacity at the operating temperature and more preferably 98 to 100%. The hot brine is recirculated via the injection well and since it is substantially saturated with respect to NaCl will selectively dissolve the KCl. The brine then containing NaCl-KCl is pushed to the earth's surface where it is cooled and KCl crystallizes out. The brine is reheated and again passed to the injection well.

We have now found that alcohols, amines and ketones will cause increased precipitation of the KCl, thus increasing the amount of KCl which can be recovered per cycle. These compounds may exhibit inverse solubility in water with heat, thus upon reheating the brine, the addition is either vaporized and condensed for further use or forms a separate liquid phase which is decanted for further use depending upon the boiling point and the injection temperature. For example, the low molecular weight alcohols such as methanol, ethanol, isopropanol and the like are vaporized and condensed, whereas the amines and ketones generally employed form a liquid phase.

The additives include, but are not limited to, 2-butoxyethanol, dimethylaminopropylamine, diethylaminopropylamine, n-amylamine, diethylaminoethanol, diisopropylamine, methylethylketone, diethylketone, ethylpropylketone, methanol, ethanol, isopropanol, butanol, hexanol, ethylenediamine, allyl alcohol, 2-pentanol, 1,7-heptanediol, tertiary butyl alcohol, erythritol, arabitol, 1,4-pentanediol, cyclohexanol and the like. Mixtures of such materials can sometimes be used to advantage.

From the above examples it can be seen that the alcohols, ketones and amines can be aliphatic, cyclic, aromatic, saturated or unsaturated and can have one or more functional groups, e.g., mono or di or more functional groups. It should be understood that the pressure and temperature conditions in the well will be such that the additive is liquid and in admixture with the brine.

In general, the amount of additive will depend upon the particular additive and its solubility; however, 2 to 100 volumes of additive per 100 volumes of brine will be used, more generally 10 to 50 volumes additive per 100 volumes of brine are utilized.

The temperature at which the additive is added will be in the temperature range where the solvent is partially completely miscible with the brine. This temperature will, for most additives, be in the range 40–100° C. The KCl crystals then can be recovered from the brine with or without additional cooling depending upon the economics of heating and cooling at the particular site. After recovery of the precipitated or crystallized KCl, the brine phase is heated to injection temperature and passed through a separator to recover the additive which becomes immiscible with water at the elevated temperature. The additive is then cooled and recycled.

Several runs were made to determine the effectiveness of the solvent additive in precipitating KCl from KCl-NaCl aqueous solutions.

In the first series of runs, various compounds were added to a saturated aqueous solution of NaCl and KCl at room temperature (70–75° F). The NaCl and KCl left in solution was determined. The results are given in Table I.

TABLE I

| Run No. | Additive | Vol. Percent Concentration of Additive | Percent NaCl in Solution | Percent KCl in Solution |
|---|---|---|---|---|
| 1 | None | 0 | 20 | 11 |
| 2 | Ethanol | 10 | 17 | 4.5 |
| 3 | do | 20 | 14 | 4 |
| 4 | do | 50 | 6 | 2 |
| 5 | Isopropanol | 10 | 20 | 9.5 |
| 6 | do | 20 | 18.5 | 8 |
| 7 | Methanol | 10 | 17.5 | 8.5 |
| 8 | do | 50 | 8 | 2.5 |
| 9 | Ethylenediamine | 10 | 17 | 6.5 |
| 10 | do | 50 | 9.5 | 1 |
| 11 | Acetonitrile | 10 | 16.5 | 11 |
| 12 | do | 50 | 17 | 11 |
| 13 | Formic acid | 10 | 19 | 11 |
| 14 | do | 50 | 9.5 | 5.5 |
| 15 | Ammonia | 10 | 17.5 | 9.5 |
| 16 | do | 40 | 16.5 | 1 |

Since magnesium chloride and/or magnesium sulfate will frequently be found in KCl-NaCl deposits, a series of runs were made to determine the effect of the additive on these compounds. The brine solution at room temperature had either MgCl₂ or MgSO₄ added prior to adding the precipitating compound. The results are shown in Table II.

TABLE II

| Run No. | Additive | Vol. Percent Concentration of Additive | NaCl | KCl | MgCl₂ | MgSO₄ |
|---|---|---|---|---|---|---|
| 17 | None | 0 | 11 | 7.5 | 10.5 | |
| 18 | Ethanol | 10 | 9.5 | 5 | 9.5 | |
| 19 | do | 50 | 2.5 | 1 | 5.5 | |
| 20 | None | 0 | 14 | 9 | | 9 |
| 21 | Ethanol | 10 | 12 | 7 | | 8 |
| 22 | do | 50 | 3 | 1.5 | | 5 |
| 23 | Ammonia | 10 | 12.5 | 3 | | 2 |
| 24 | do | 30 | 6.5 | 1 | | 3 |

As has been indicated, the brine from the producing well is hot, therefore, a number of runs were made wherein the additive was introduced into brine at elevated temperatures. The results of these runs are shown in Table III.

TABLE III

| Run | Additive | Wt. Percent Concentration of Additive | Temperature, °C. | Percent NaCl | Percent KCl |
|---|---|---|---|---|---|
| 25 | None | 0 | 66 | 18 | 17 |
| 26 | Ethanol | 10 | 66 | 18 | 9 |
| 27 | do | 50 | 66 | 6.5 | 4.5 |
| 28 | Methanol | 10 | 66 | 16.5 | 9 |
| 29 | do | 50 | 66 | 8 | 4.5 |
| 30 | None | 0 | 50 | 18.5 | 14.5 |
| 31 | Ammonia | 10 | 50 | 18.5 | 11.5 |
| 32 | do | 40 | 50 | 16 | 3.5 |

Other materials tested as in runs 1–32 but which were only slightly effective, if at all, include acetic acid, hydrogen sulfide, sulfur dioxide, carbon dioxide, diethyl ether, phthalic acid, chloroform, ammonium sulfide and butyl alcohol.

In this series of runs, the materials tested would be those which would be recovered by distillation and condensation. It can be seen in Table I that ethanol and ethylenediamine at 10% concentration are much more effective in removing KCl than is ammonia. It is also shown in Table III that at elevated temperatures, the alcohols were more effective than ammonia.

It was also found that the precipitate formed with ammonia was slimy and extremely difficult to filter. However, the precipitate formed by the compounds of this invention was crystalline and readily filtered out.

A typical operation using these low boiling additives would be: a brine saturated with KCl and NaCl from a solution mining operation at high temperature is first cooled to 70° C. precipitating a portion of the KCl and at which time the salt in solution is 17% KCl and 18% NaCl. A material such as ethanol is then mixed into the brine to about 10% concentration by volume precipitating additional salt to about 9% KCl concentration while the solubility of the NaCl is not altered appreciably.

The crystalline KCl is then filtered and the 70° C. brine is reheated to the desired injection temperature via a 2 or 3-stage distillation column wherein the ethanol is recovered for recycling to the precipitation stage. It should be noted to obtain a 9% KCl solution by lowering temperature only would require the system to be cooled to 10° C. with a considerable loss in energy.

Several runs were made wherein the brine was at 112° C. and contained 23% NaCl and 13% KCl. It will be noted that at this temperature the brine is saturated with respect to NaCl but is undersaturated with respect to KCl. The solution was cooled to 43° C., the saturation temperature for the KCl with appreciable precipitation of NaCl. At this temperature, 2 volumes of the additive were mixed with 5 volumes of brine and the solution further cooled to room temperature. The solid was analyzed for KCl and NaCl. Results are shown in Table IV.

TABLE IV

| Run | Additive | Recovery, grams/100 ml. brine | | Additional Recovery, grams/ 100 ml. brine | | Selectivity, gms./gms.[1] |
|---|---|---|---|---|---|---|
| | | KCl | NaCl | KCl | NaCl | KCl/NaCl |
| 33 | None | 3.74 | 1.94 | | | |
| 34 | 2-butoxyethanol | 4.09 | 2.51 | .35 | .57 | .74 |
| 35 | Methylethylketone | 4.37 | 2.91 | .63 | .97 | .65 |
| 36 | Diethylaminopropylamine | 8.12 | 5.70 | 4.38 | 3.76 | 1.17 |
| 37 | Diethylaminoethanol | 6.06 | 4.52 | 2.32 | 2.58 | .89 |
| 38 | n-Amylamine | 5.41 | 2.00 | 1.67 | .06 | 27.8 |

[1] The selectivity is the ratio of additional KCl recovered/additional NaCl recovered. Water removal alone should give a .555 ratio at 25° C. (i.e., by distillation).

In the above runs, 33–38, 12.4 grams of KCl/100 ml. remained in the solution with no solvent. Additional recovery using diethylaminopropylamine solvent was 4.38 grams or 35.5% of the KCl not normally recovered. These runs show that the organic solvents of this invention will increase appreciably the total solids recovered from KCl-NaCl brines. They also show that selectivity for precipitation is a function of solvent and a much higher recovery of KCl per cycle can be obtained than from cooling alone. It is also pointed out that the original brine was undersaturated with respect to KCl while saturated with NaCl and that the brine was cooled down to room temperature.

In normal operation, the brine from solution mining will be cooled only sufficiently for miscibility of the solvent and brine and the KCl recovery is greatly increased with only slight increase in NaCl. For example, a typical operation would be as described for low boiling solvents except, after filtering the salts out, upon heating the brine to the desired injection temperature the solvent will form a separate liquid phase and the solvent-brine is passed to a suitable separator wherein the solvent is separated off and recycled to the precipitation step.

Those skilled in the art will see many modifications and applications of the method herein described without departing from the scope of this invention.

Having thus described the invention, we claim:

1. A method of precipitating KCl from NaCl-KCl aqueous solutions which comprises adding to such solutions an effective amount of from 2 to 100 volumes of an organoamine per 100 volumes of aqueous solution, said organoamine being selected from the group consisting of alkylaminoamines having up to 7 carbon atoms, ethylenediamine, and alkylaminoalcohols having up to about 6 carbon atoms, at a temperature wherein the amine is at least partially soluble in the brine, thereby precipitating KCl from solution and thereafter separating the solution from the precipictate.

2. The method of claim 1 wherein the organoamine exhibits inverse water solubility with heat.

3. The method of claim 2 wherein the organoamine is recovered by heating the solution subsequent to separation of the salt to a temperature wherein said organic compound becomes insoluble.

4. The method of claim 3 wherein the organic compound is added to the brine solution in a volume ratio of 10 to 50 volumes organic compound per 100 volumes brine.

5. The method of claim 3 wherein the organic compound is vaporized at the separation temperature and is recovered by distillation and condensation for recycle to the precipitation step.

6. The method of claim 3 wherein the organic compound is liquid at the separation temperature and is recovered by decanting for recycle to the precipitation step.

7. The method of claim 6 wherein the organic compound is diethylaminopropylamine.

8. The method of claim 6 wherein the organic compound is diethylaminoethanol.

References Cited

UNITED STATES PATENTS

| 3,231,340 | 1/1966 | Gaska | 23—302 X |
| 3,279,897 | 10/1966 | Goodenough | 23—302 |
| 3,359,076 | 12/1967 | Gaska | 23—302 X |

FOREIGN PATENTS

| 929,127 | 6/1955 | Germany. |
| 572,374 | 1/1958 | Italy. |

OTHER REFERENCES

Gilliot: Bull. Soc. Chem., France, M. 1951, pp. 992 to 995.

NORMAN YUDKOFF, *Primary Examiner.*

S. J. EMERY, *Assistant Examiner.*

U.S. Cl. X.R.

23—302, 89; 299—5; 210—54